United States Patent
Anai

(10) Patent No.: US 8,514,416 B2
(45) Date of Patent: Aug. 20, 2013

(54) INFORMATION PROCESSING METHOD AND INFORMATION PROCESSING APPARATUS

(75) Inventor: Hiroki Anai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 330 days.

(21) Appl. No.: 12/986,997

(22) Filed: Jan. 7, 2011

(65) Prior Publication Data

US 2011/0194132 A1    Aug. 11, 2011

(30) Foreign Application Priority Data

Feb. 10, 2010 (JP) ................................. 2010-028212

(51) Int. Cl.
*G06F 15/00* (2006.01)
(52) U.S. Cl.
USPC ......................................................... 358/1.13
(58) Field of Classification Search
USPC ............................................................. 358/1.13
See application file for complete search history.

(56) References Cited

U.S. PATENT DOCUMENTS

2005/0206941 A1   9/2005 Shima
2010/0073702 A1*  3/2010 Shima .......................... 358/1.13

FOREIGN PATENT DOCUMENTS

JP         2002247367 A      8/2002

OTHER PUBLICATIONS

Chinese Office Action dated Mar. 27, 2013, in counterpart Chinese Application No. 201110034662.7 (with English translation).

* cited by examiner

*Primary Examiner* — Saeid Ebrahimi Dehkordy
(74) *Attorney, Agent, or Firm* — Fitzpatrick, Cella, Harper & Scinto

(57) ABSTRACT

The data conversion unit of a printer driver makes a copy of a spool file in PDF and stores it as PDF data 1 in an external storage device. The raster data creation unit of the printer driver acquires PDF data 1 stored by the data conversion unit, and creates new PDF data 2 in which a target object is drawn in accordance with an object contained in PDF data 1. The raster data creation unit of the OS then converts PDF data 2 into raster data 2. The raster data creation unit specifies a target object of the raster data created from the spool file by referring to created raster data 2, and creates print data by performing necessary processing for the target object.

8 Claims, 9 Drawing Sheets

PDF PRINT DATA 601

PDF DATA 2 604

RASTER DATA 1 606

RASTER PRINT DATA 607

INFORMATION PROCESSING METHOD AND INFORMATION PROCESSING APPARATUS

BACKGROUND OF THE INVENTION

1. Field of the Invention

The present invention relates to an information processing method and an information processing apparatus, for example, a processing method of determining the region of an object contained in print data.

2. Description of the Related Art

In general, an operating system (to be referred to as an OS hereinafter) installed in a host computer includes a printing system for supporting printing in an environment in which a printer is connected to the PC which issues a print request. As such a printing system, a CUPS (Common UNIX® Printing System) operating on Mac OS X® available from Apple Inc., U.S.A. is known. Mac OS X® uses PDF (Portable Document Format®) as the standard data format of a spool file created by the OS in accordance with a print request from an application.

In general, a printer cannot directly interpret a spool file, and hence the printing system or printer driver converts the data format of the file into that which can be interpreted by the printer. When, for example, a raster printer such as an ink-jet printer performs printing, the following processing is performed. The data conversion unit of a printer driver processes the spool file created by the OS in accordance with a print request from an application. The raster data creation unit of the OS then converts the resultant data into raster data. The print data creation unit of the printer driver converts this raster data into a data format that can be interpreted by the printer, and sends the data to the printer via the back-end, thereby printing the data. In this manner, in CUPS, several processing units sequentially perform processing in cooperation with each other to convert the data format, thereby printing the data. The processing sequence of these processing units is determined by the system.

Some printer drivers perform image processing in accordance with an object such as a bitmap or text contained in print data in order to allow the printer to print with higher image quality. Such a printer driver receives print data in a page description language (to be referred to as a PDL hereinafter) from an OS, and interprets its print command to recognize an object such as a bitmap or text contained in print data. The printer driver then performs image processing corresponding to each object in accordance with the recognition result and prints the result (see, for example, Japanese Patent Laid-Open No. 2002-247367).

Consider a case in which a CUPS for a raster printer like that described above performs image processing for print data which can be printed by the printer, in accordance with an object contained in print data. In this case, the print data creation unit of the printer driver needs to identify an object contained in the print data and determine its region. However, since the print data creation unit receives the raster data created by the raster data creation unit of the OS, it is generally difficult to determine the region of an object contained in the print data. It is necessary to perform complex calculation to interpret raster data and determine the region of an object. However, the print data creation unit cannot always determine the region of an object correctly. In addition, when the background color of a bitmap object contained in print data is the same as that of a page, the print data creation unit may not correctly determine the region of the object.

Consider the possibility of the determination of the region of an object by the data conversion unit of the printer driver described above. This data conversion unit corresponds to cupsPrefilter added by CUPS 1.3 in Mac OS X Leopard 10.5. The data conversion unit receives a spool file in PDF as an input, which is print data before conversion to raster data by the raster data creation unit of the OS, and outputs data in PDF. The print data creation unit of the printer driver receives this output data. It may seem possible to determine the region of an object contained in print data by interpreting the internal command of the PDF data.

There is, however, one problem in this case. According to the specifications of Mac OS, the raster data creation unit provided by the OS performs operations associated with pages, such as page imposition, enlargement/reduction, and feed sequence, which can be set at the time of printing. For this reason, it is not possible to directly use the region of an object obtained by causing the data conversion unit of the printer driver to analyze a spool file in PDF. This is because, operations such as page imposition, enlargement/reduction, and feed sequence, executed by the raster data creation unit, are not reflected in the spool file, and this data does not generally match raster data transferred to the print data creation unit of the printer driver. In order to match the two data, it is necessary to grasp the detailed specifications of the raster data creation unit of the OS and perform coordinate calculation upon performing processing similar to that performed by the raster data creation unit. However, since the specifications of the raster data creation unit are not disclosed to the public, it is generally difficult to perform this operation.

SUMMARY OF THE INVENTION

The present invention has been made in consideration of the above problem, and provides an information processing apparatus and method which can determine the region of an object in raster data output from a printing system in which the OS implements a function of converting print data into raster data to allow, for example, a raster printer to print, without requiring a printer driver to perform complex calculation.

The present invention has the following arrangement. According to one aspect of the present invention, an information processing apparatus which includes raster data creation means for converting data in a first format which is described by a page description language into raster data in accordance with a print setting, the apparatus comprises: object region data creation means for creating object region data in the first format which includes region data representing a region of a specific object contained in processing target data in the first format based on the processing target data; and specifying means for comparing the processing target data converted into raster data by the raster data creation means with the object region data converted into raster data by the raster data creation means in accordance with the same print setting as that for the processing target data and specifying the specific object in the processing target data converted into the raster data.

According to still another aspect of the present invention, an information processing apparatus characterized by comprises: raster data creation means for converting data in a first format which is described by a page description language into raster print data in accordance with a print setting; object region data creation means for creating object region data in the first format which includes region data representing a region of a specific object contained in processing target data in the first format based on the processing target data; conversion means for converting object region data created by the object region data creation means into raster data in accordance with the same print setting as that for the processing target data; and creation means for creating print data so as to print, with glossy ink, a portion of the raster print data converted by the raster data creation means, which corresponds to raster data converted by the conversion means.

According to the present invention, it is possible to accurately associate an object contained in data before rasterization with that after rasterization. This makes it possible to accurately determine the region of the object in the raster data. Assume that the magnification of an object in image data is changed or the object is moved in rasterization provided by an operating system. In this case, even if the location or size of the object is to be changed in the process of rasterization, it is possible to determine the region of an object in the raster data by accurately associating the object before rasterization, for example, the data in a page description language format, with the object contained in the raster data.

Further features of the present invention will become apparent from the following description of exemplary embodiments with reference to the attached drawings.

DESCRIPTION OF THE EMBODIMENTS

The embodiments of the present invention will be described in detail below with reference to the accompanying drawings. The following embodiments do not limit the present invention according to the appended claims, and not all combinations of characteristic features described in the embodiments are essential to the solving means of the present invention.

First Embodiment

<Hardware Arrangement of Information Processing System>

Figure 1:
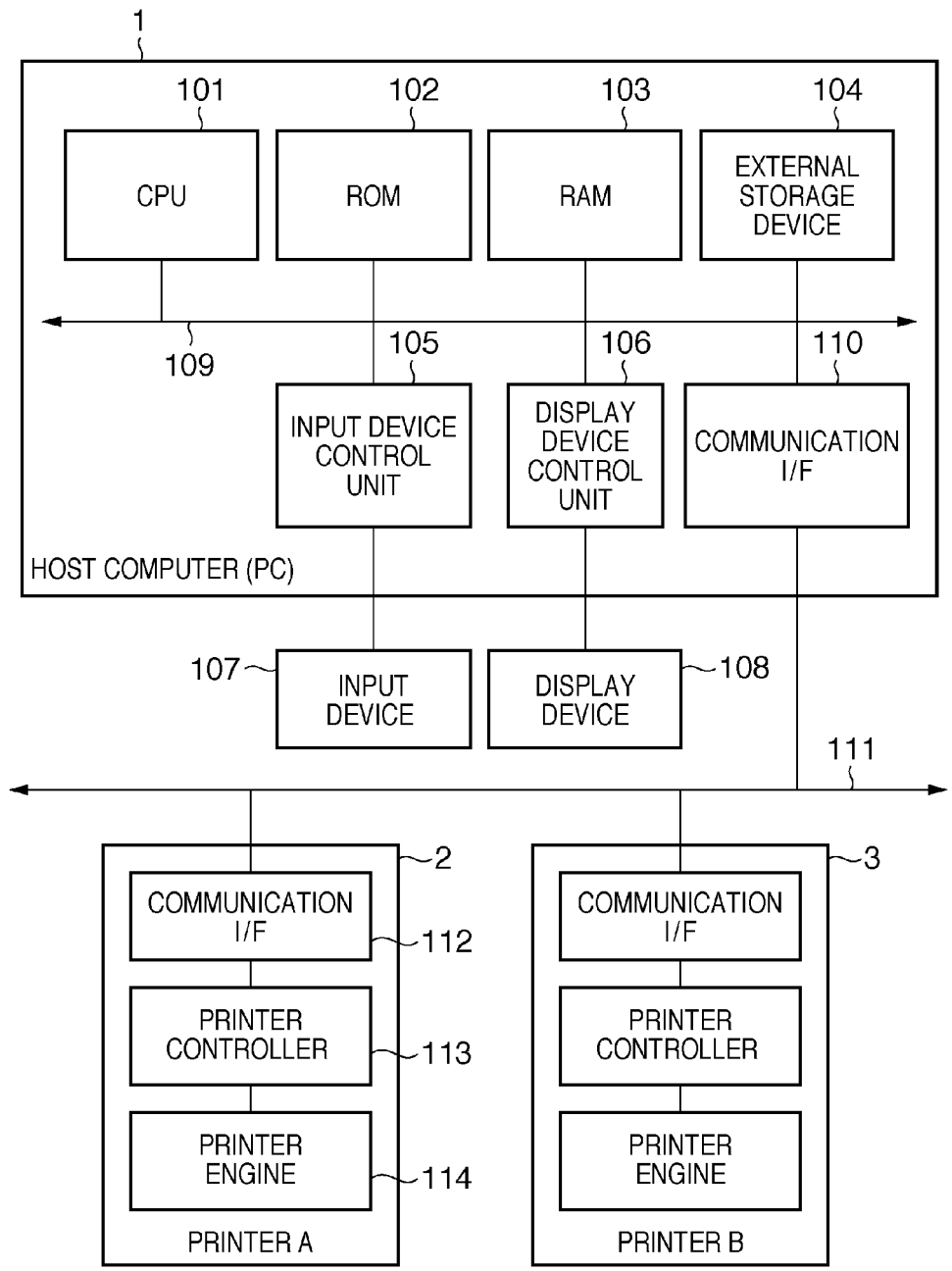
FIG. 1 is a block diagram showing a hardware arrangement in an embodiment of the present invention.

FIG. 1 is a block diagram showing the hardware arrangement of an information processing system constituted of an information processing apparatus and peripheral devices according to an embodiment of the present invention. FIG. 1 shows an example of a printing system which allows printers A2 and B3 to communicate with a PC 1 via a communication bus 111 such as Ethernet® or universal serial bus (to be referred to as a USB hereinafter). The PC 1 is an example of the information processing apparatus. Assume that an OS equivalent to Mac OS X® is installed in the PC 1, and a CUPS incorporated in Mac OS X® is used as a printing system. FIG. 1 shows only the two printers. However, it is possible to connect an arbitrary number of printers to the PC 1 via the communication bus 111.

In the PC 1, a CPU 101 controls the respective units in accordance with programs stored in a RAM 103 and an external storage device 104. The CPU 101 executes printer drivers corresponding to the printers A2 and B3, converts output information created based on an application program into an output command corresponding to a printer, and outputs the command to the printer A2 or B3 according to a predetermined protocol. The respective processing units (the data conversion unit and print data creation unit) executed by the CPU 101 implement the procedure in the flowchart of FIGS. 5A and 5B. The data conversion unit executes steps S501 to S504. The print data creation unit executes steps S505 to S514. A ROM 102 stores the BIOS program executed by the CPU 101 and font data. The CPU 101 writes or reads data or a program in or from the RAM 103, as needed. When activating the printer driver, the CPU 101 loads the program codes of the printer driver in the RAM 103. The external storage device 104 is a file storage device, and stores program codes, spool files, raster data, and the like which the CPU 101 reads out. The external storage device 104 is a device which implements part of the function of this embodiment, and includes, for example, an FD, CD-RW, and HDD. An input device control unit 105 controls an input device 107 such as a keyboard and mouse. A display device control unit 106 controls a display device 108 such as a CRT. An internal bus 109 is constituted by a data bus and system bus which perform data communication between the respective constituent elements. A communication I/F 110 controls communication with the printers A2 and B3 via the communication bus 111 and allows two-way communication. Although a plurality of types of interfaces is available, including, for example, USB and IEEE1394 as serial interfaces and Centronics and SCSI as parallel interfaces, it is possible to use any type of interface as long as it implements two-way communication.

The printer A2 is a raster printer which receives and prints raster data. As will be described later, this printer has a function of forming images with glossy ink in addition to a function of forming images with color ink. In the printer A2, a printer controller 113 performs printing by controlling a printer engine 114 based on the printer command obtained from a communication I/F 112. The printer engine 114 is a mechanism for operating a printer head and conveying a recoding medium.

<Software Arrangement of Information Processing System>

Figure 2:
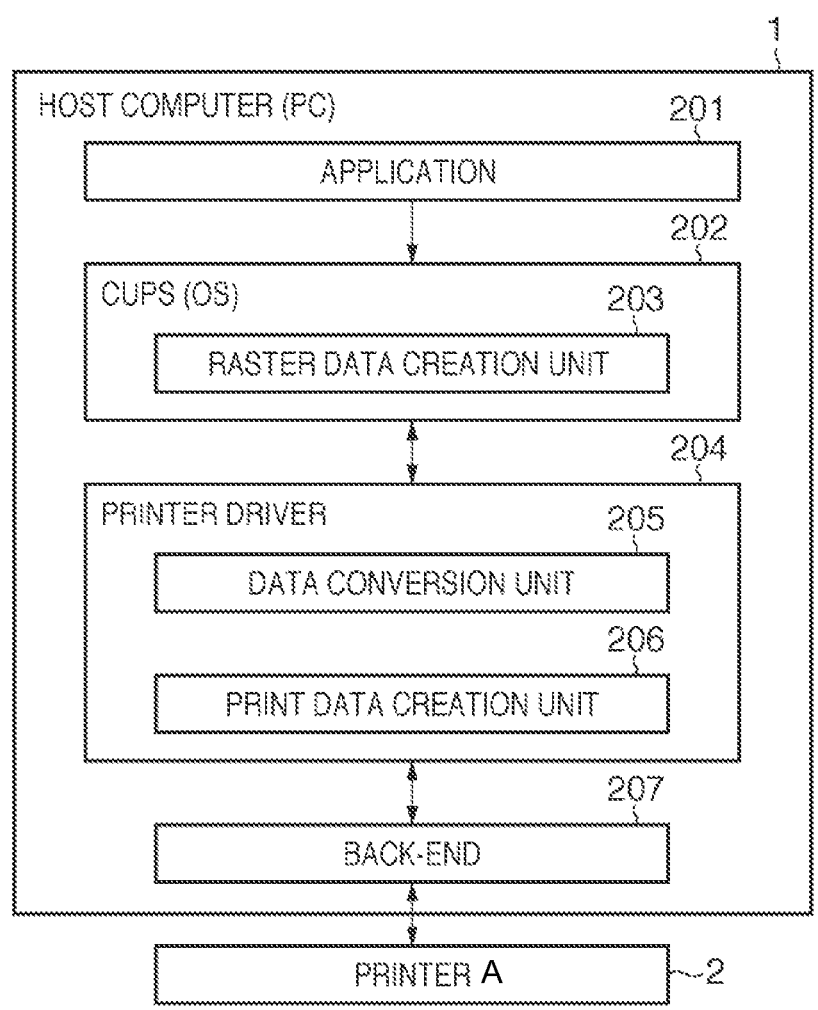
FIG. 2 is a block diagram showing the software arrangement of an information processing apparatus.

FIG. 2 is a block diagram showing the software arrangement of the PC 1. The PC 1 includes a CUPS 202 and a printer driver 204. The PC 1 converts the print data obtained by an application 201 into print data which can be processed (printed) by the printer A2 via the CUPS 202 and the printer driver 204, and outputs the print data. The application 201 issues a print request to the CUPS 202, and transfers drawing data to be printed and print setting information obtained by setting a paper size, paper type, page imposition, enlargement/reduction, and the like to the CUPS 202. The CUPS (OS) 202 performs various kinds of print control operations such as spooling drawing data sent from the application 201 and loading/executing the printer driver 204. The OS 202 also includes a raster data creation unit 203 and has a function of converting print data into raster data. The printer driver 204 includes a data conversion unit 205 and a print data creation unit 206. The printer driver 204 receives print data and print setting information from the CUPS 202 and performs processing necessary for printing operation. The data conversion unit 205 performs preprocessing necessary for print processing of the received print data before processing by the raster data creation unit 203. The print data processed by the data conversion unit 205 is transferred to the print data creation unit 206 via the raster data creation unit 203 described above. The print data creation unit 206 receives the raster data created by the raster data creation unit 203, and creates print data based on the print setting information. A back-end 207 outputs the print data created by the print data creation unit 206 to the printer A2.

Figure 3:
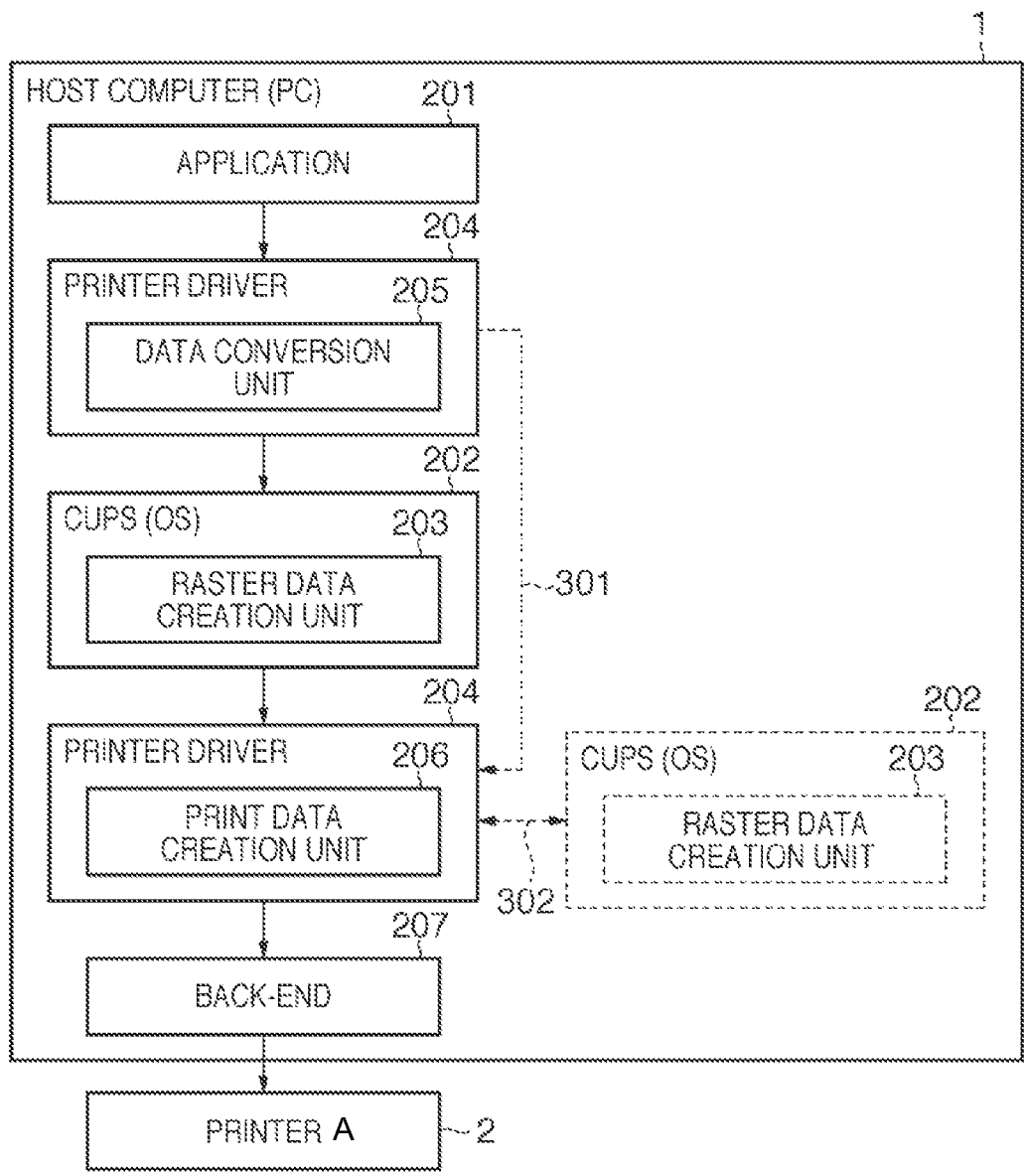
FIG. 3 is a block diagram showing the first embodiment of the present invention to explain a processing procedure for print data.

FIG. 3 is a block diagram for explaining a processing procedure for print data in the first embodiment of the present invention. This block diagram includes, as its characteristic arrangement, new data flows (indicated by the broken lines) for object region determination unique to this embodiment. That is, the new data flows are a data flow 301 from the data conversion unit 205 to the print data creation unit 206 and a data flow 302 between the print data creation unit 206 and the raster data creation unit 203. Processing to be performed when the application 201 performs printing will be sequentially described, assuming that the format of a spool file created by the OS 202 is PDF (Portable Document Format) as standard in the OS. Note that the spool file created by the OS 202 has a page description language format, such as the PDF, designed to describe an object in an identifiable manner. In this embodiment, this format will be referred to as the first format.

Figure 4A:
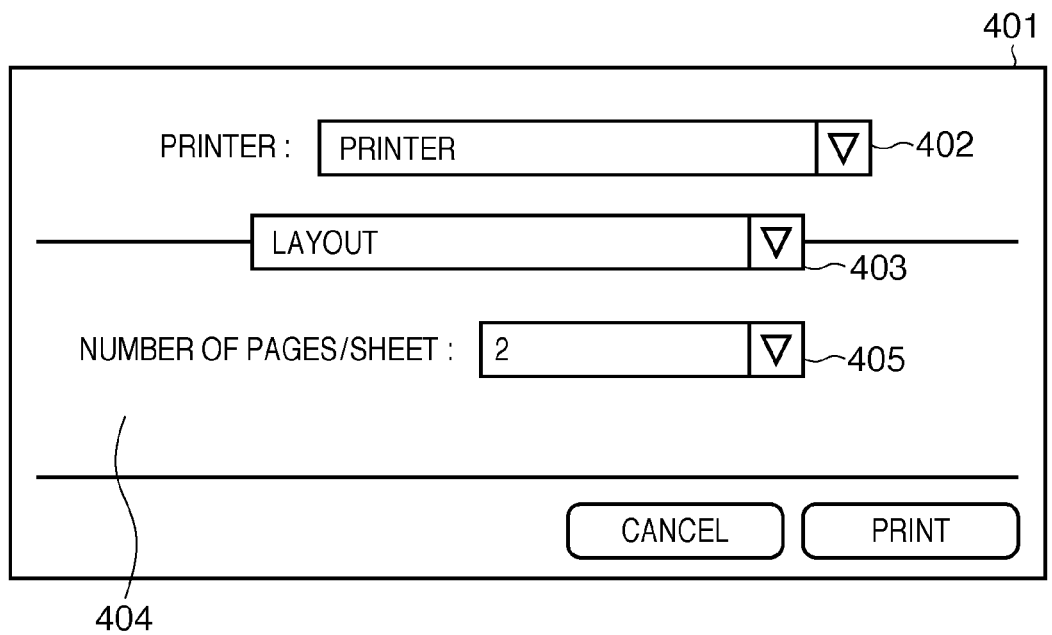
FIGS. 4A and 4B are views showing the user interfaces provided by an OS and a printer driver.

In this embodiment, for the sake of facilitating the understanding of the effects of the present invention, assume that the OS 202 has a function of allowing the selection of an imposition setting, as a print setting, which is the number of pages per sheet. Assume that the user can make this print setting via a user interface (to be referred to as a UI hereinafter) provided by the OS 202 at the time of printing from the application 201. FIG. 4A shows an example of the UI. A UI 401 is displayed to set a page layout. The UI 401 includes a printer selection menu portion 402, a print setting panel selection menu portion 403, and a print setting panel display portion 404. The printer selection menu portion 402 is a selection field which displays a list of printers as menu items when a plurality of printers is registered in the OS 202 and allows the user to select a printer. The print setting panel selection menu portion 403 is a selection field which displays a list of item groups, as menu items, which are obtained by classifying various types of setting items necessary for print processing into item groups, and allows the user to select a setting item. The items which can be selected via the print setting panel selection menu portion 403 include those provided by the OS 202 and those provided by the printer driver 204; "layout" selected in FIG. 4A is an example of the function provided by the OS 202. The print setting panel display portion 404 displays the details of information based on the setting item selected in the print setting panel selection menu portion 403. An imposition setting portion 405 is a setting field for setting the number of pages per sheet, and allows the user to set an imposition via a popup menu. Note that this embodiment will be described below, assuming that "2 pages/sheet" is set in the imposition setting portion 405. Note that the print settings selected via the UI in FIG. 4A are stored as part of print setting information.

Figure 4B:
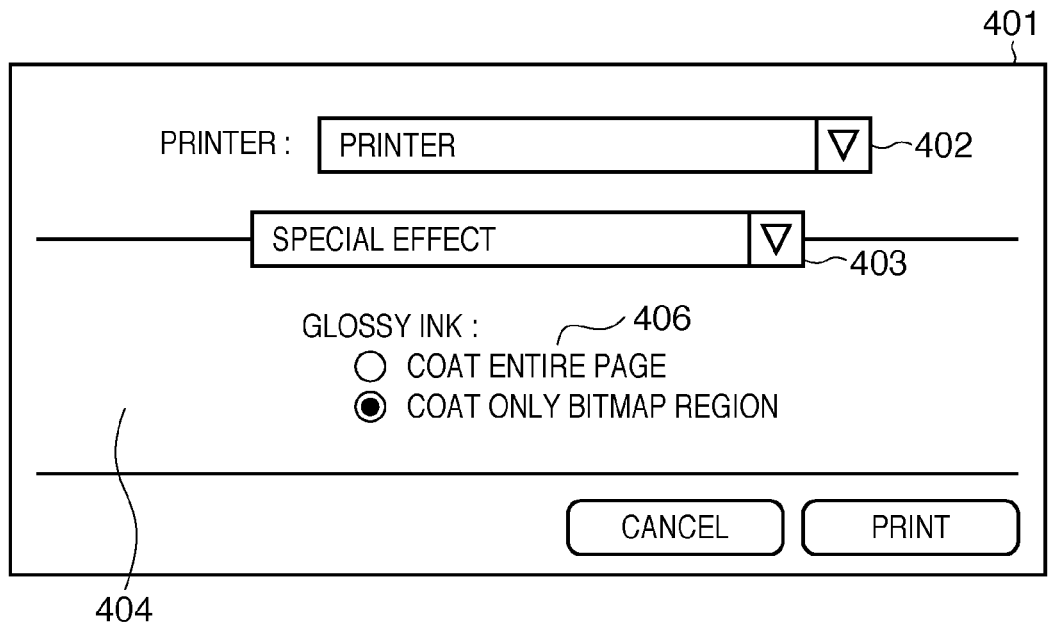

The printer A2 used for printing in this embodiment has a function of forming an image on a sheet by coating it with ink having glossiness (to be referred to as glossy ink hereinafter). Printing with glossy ink is executed by sending region data to be coated with glossy ink to the printer A2, together with general print data. Assume that when the application 201 executes printing, the UI provided by the printer driver 204 allows the user to select an option associated with glossy ink. FIG. 4B shows an example of this UI, which is displayed to make the user select a region to be coated with glossy ink. A printer selection menu portion 402, a print setting panel selection menu portion 403, and a print setting panel display portion 404 have the same functions as those in FIG. 4A. Radio buttons 406 are displayed to make the user select one of the following: "to coat entire page" or "to coat only a bitmap region". When the user selects "to coat entire page", the printer coats the entire page with glossy ink. When the user selects "to coat only a bitmap region", the printer coats only a bitmap region with glossy ink without coating portions other than the bitmap region. The raster data creation unit 203, printer driver 204, data conversion unit 205, and print data creation unit 206 of the OS 202 can receive set values for the functions provided by the OS 202 and printer driver 204 as print setting information, together with print data, and perform processing in accordance with the received set values.

<Image Data Processing>

Figure 6A:
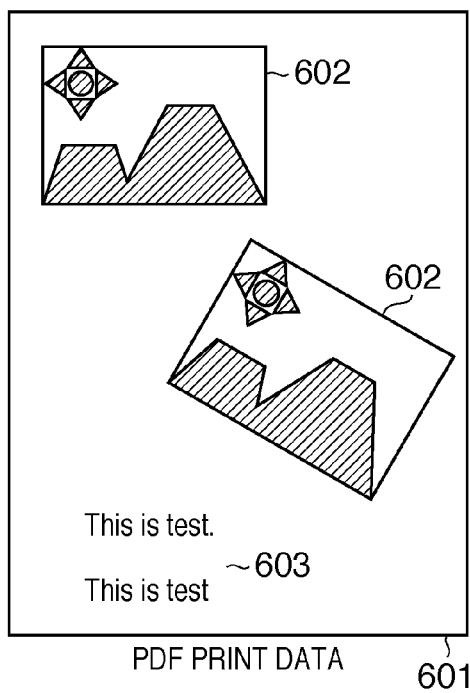
FIGS. 6A, 6B, 6C, and 6D are views each showing an example of actual print data and data created for bitmap region determination.

Specific processing will be described by referring back to FIG. 3. When the application 201 issues a print request in accordance with operation by the user or the like, the OS 202 receives the drawing data to be printed and print setting information from the application 201, and creates a spool file in PDF (to be referred to as PDF print data hereinafter). As described above, this data corresponds to the data in the first format. FIG. 6A shows an example of PDF print data. PDF print data 601 represents one page of the data in PDF to be printed. An object 602 is a bitmap object. An object 603 is a text object. In this case, the bitmap object 602 is a region determination target, that is, an object to be specified (specific object). PDF print data allows specification of these objects.

First of all, the created PDF print data is input to the data conversion unit 205 of the printer driver 204. The data conversion unit 205 receives the PDF print data and the print setting information, and processes the PDF print data. The data conversion unit 205 then outputs the print data in PDF.

Figure 5A:
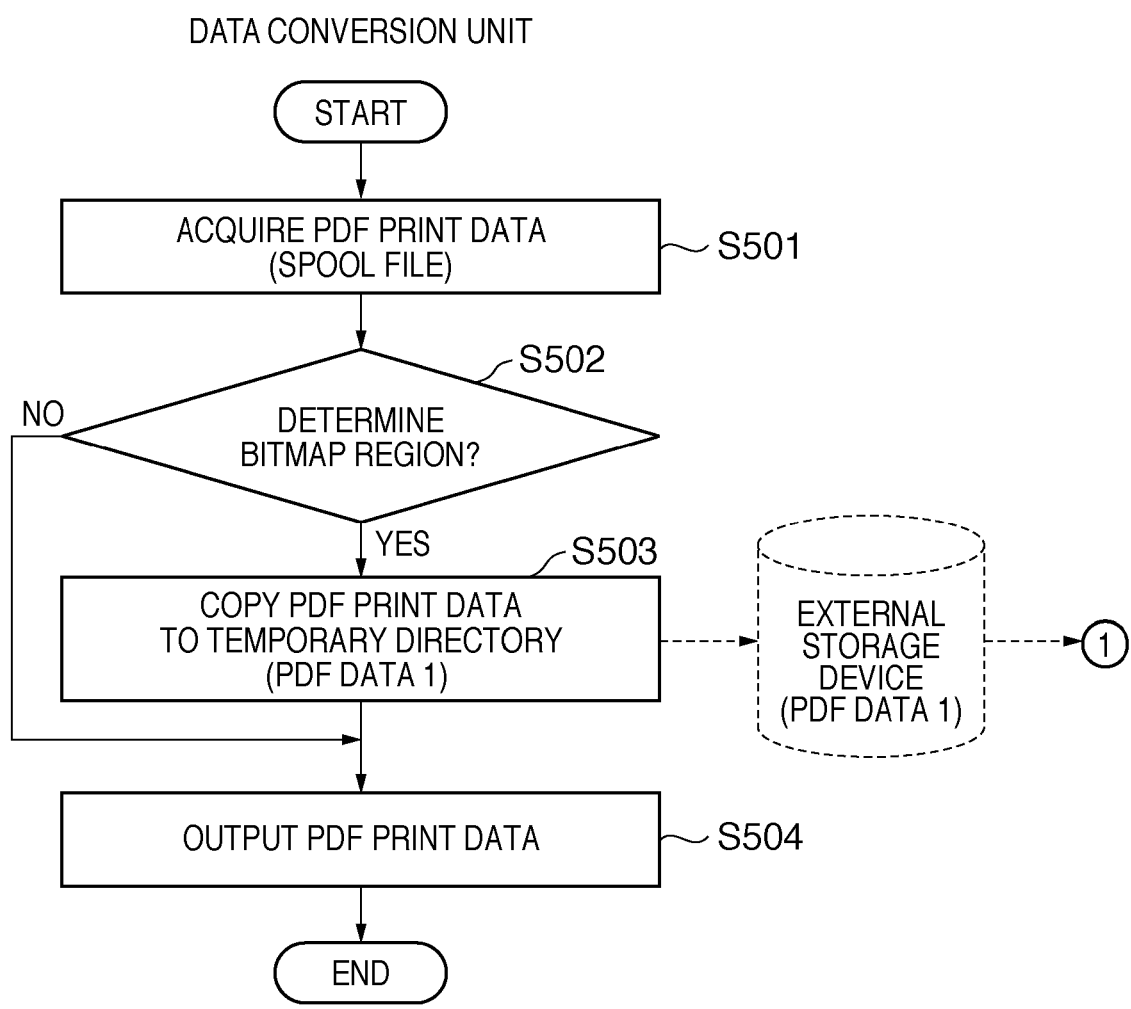
FIGS. 5A and 5B are flowcharts for explaining a procedure for processing performed by the printer driver.

Steps S501 to S504 in FIG. 5A correspond to a flowchart for explaining the processing performed by the data conversion unit 205. First of all, the data conversion unit 205 receives PDF print data (that is, processing target data) from the OS 202 (S501). The data conversion unit 205 then decides in step S502 from the print setting information whether to determine a bitmap region. In this embodiment, if the user has selected "to coat only bitmap region" on the UI in FIG. 4B, the process advances to step S503. If the user has selected "to coat entire page", the process skips step S503 and advances to step S504. In step S503, the data conversion unit 205 copies the PDF print data to a temporary directory reserved in the external storage device 104. This created copy will be referred to as PDF data 1. This processing allows the print data creation unit 206, which is to perform processing afterward, to use PDF print data which cannot be used according to the general procedure in the CUPS.

Finally, the data conversion unit 205 outputs the PDF print data in step S504 and terminates the processing. In this case, the data conversion unit 205 in this embodiment does not change the received PDF print data itself, and hence the input PDF print data, PDF data 1 to be stored, and the PDF print data to be output are all identical to each other. For example, in the case of the print data in FIG. 6A described above, both PDF data 1 and the PDF print data to be output are identical to those in FIG. 6A. Obviously, it is possible to change the PDF print data, as needed. In this case, make sure that PDF data 1 is identical to the PDF print data to be output.

Figure 6B:
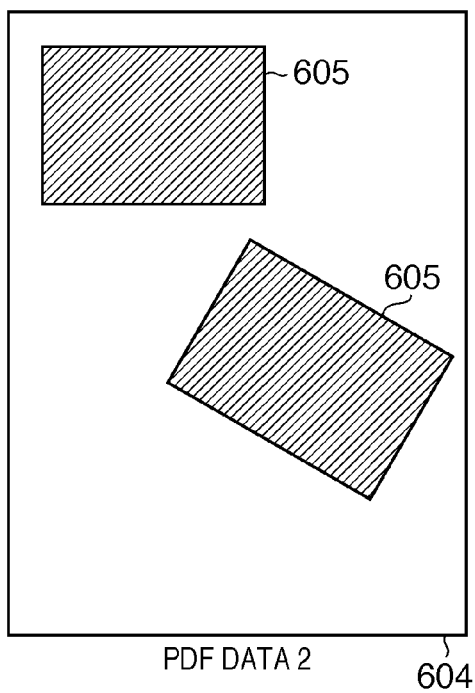
Figure 6C:
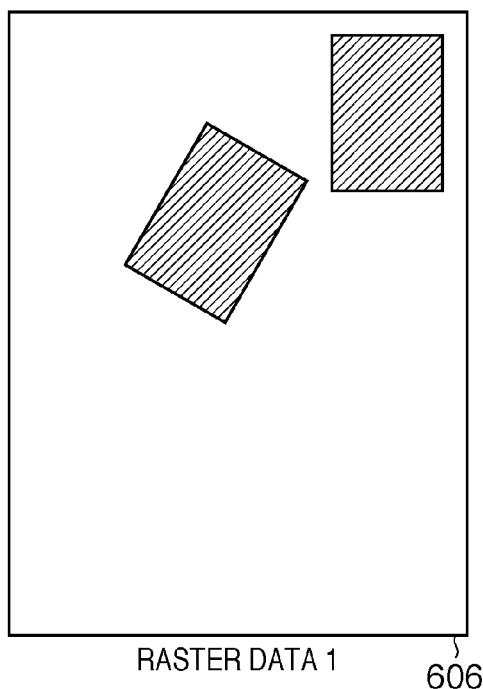
Figure 6D:
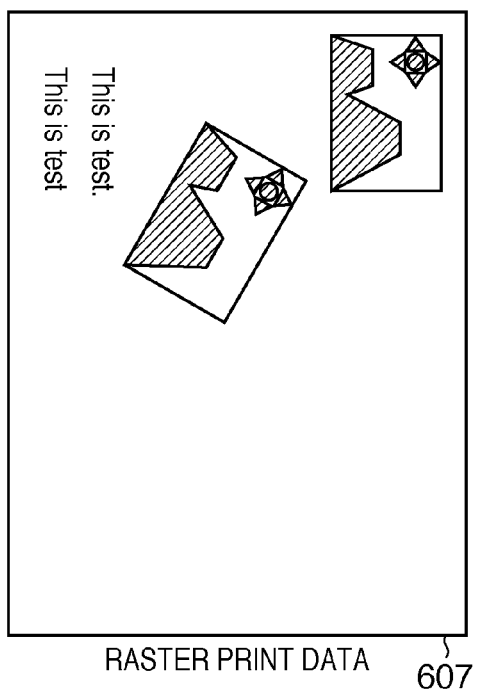

Referring back to FIG. 3, the PDF print data output from the data conversion unit 205 of the printer driver 204 is input to the raster data creation unit 203 of the OS 202. The raster data creation unit 203, which is provided by the OS 202, converts input PDF print data into raster data in accordance with print setting information. The raster data created in this case will be referred to as raster print data hereinafter. In addition, the raster data creation unit 203 also plays an important role of executing operation associated with pages such as page imposition and enlargement/reduction set in print setting information. Assume that the raster data creation unit 203 rasterizes the PDF print data 601 in FIG. 6A output from the data conversion unit 205 with the setting "2 pages/sheet" on the UI shown in FIG. 4A. In this case, raster print data 607 like that shown in FIG. 6D is created. The raster print data 607 in FIG. 6D represents one page of print data in the raster data format. In this state of the data, it is impossible to recognize the bitmap contained in the page as an object. The raster data creation unit 203 finally outputs the created raster print data and terminates the processing.

Referring back to FIG. 3, the raster print data output from the raster data creation unit 203 is input to the print data creation unit 206 of the printer driver 204. The print data creation unit 206 plays a basic role of converting the data format of the received raster print data into that which can be interpreted by the printer A2 in accordance with print setting information. In this embodiment, the print data creation unit 206 also determines a bitmap region contained in the raster print data and performs processing corresponding to the region.

Figure 5B:
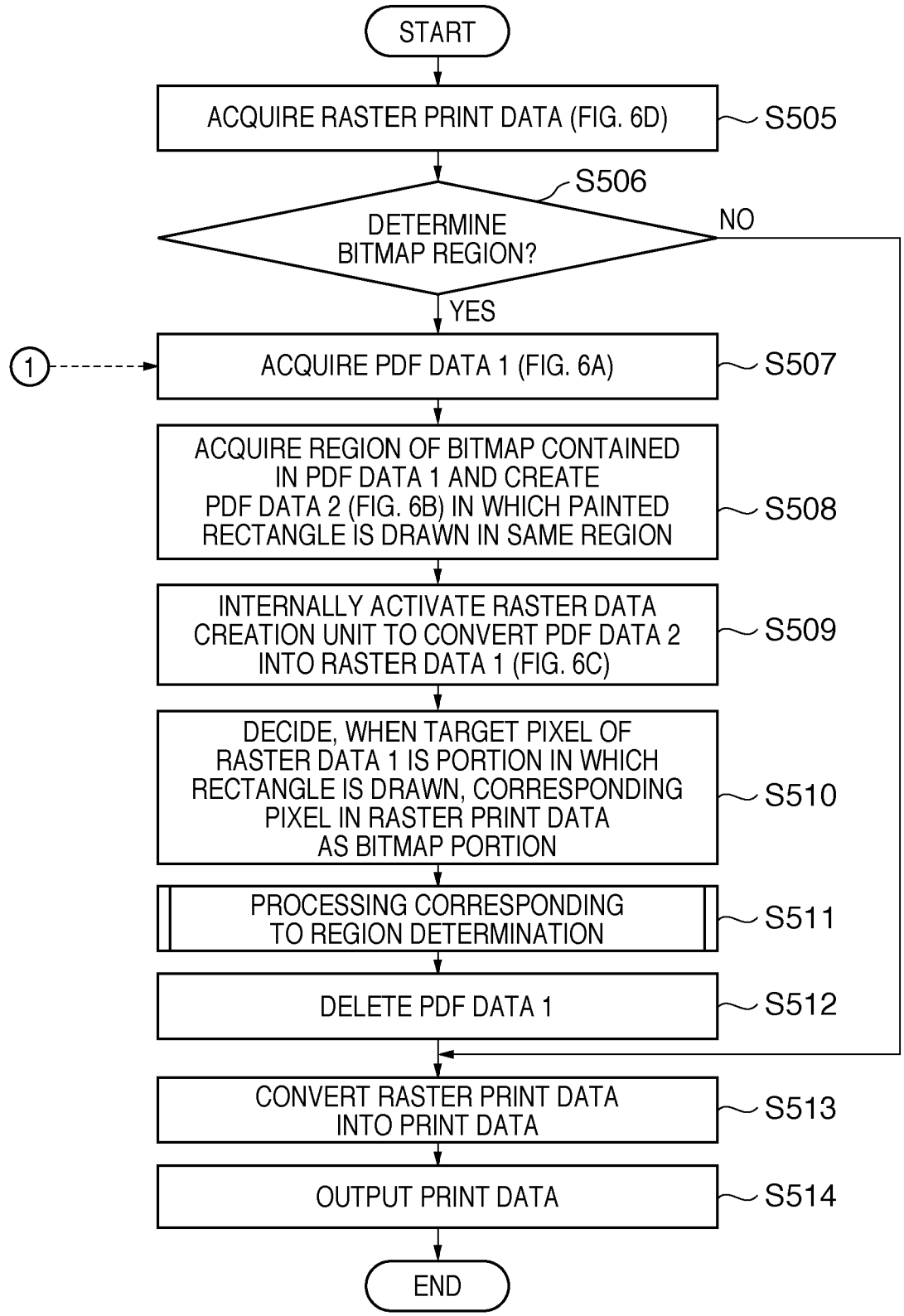

Steps S505 to S514 in FIG. 5B correspond to a flowchart for explaining the processing performed by the print data creation unit 206. First of all, the print data creation unit 206 receives the raster print data output from the raster data creation unit 203 in step S505. This raster print data is data to be actually printed. In step S506, the print data creation unit 206 then decides from the print setting information whether to determine a bitmap region. If the user has selected "to coat only bitmap region" on the UI in FIG. 4B, the print data creation unit 206 advances to step S507 like the data conversion unit 205 in step S502. If the user has selected "to coat entire page", the print data creation unit 206 advances to step S513 to perform general print data creation processing. Steps S507 to S512 correspond to the processing of actually determining a bitmap region.

First of all, in step S507, the print data creation unit 206 acquires PDF data 1 stored in the data conversion unit 205. The print data creation unit 206 then analyzes the internal command of PDF data 1, and creates new PDF data 2 for the determination of a bitmap region in the raster print data in step S508. That is, the print data creation unit 206 executes the function of creating object region data. PDF data 2 is obtained by analyzing the internal command of PDF data 1 to acquire a region in which a bitmap object is drawn, and by painting the target region in a color other than white (for example, black) so as to draw the region into a rectangle. PDF data 2 is data for specifying the region of a target object, and hence will also be referred to as object region data. For example, FIG. 6B shows the result obtained from PDF data 2 created from PDF data 1 in FIG. 6A. Referring to FIG. 6B, object region data 604 is a page in PDF which has the same page arrangement as that of the PDF print data 601 in FIG. 6A, and objects 605 represent bitmap object regions, which are drawn black rectangles. In this case, these regions are black because the object regions are drawn by using a black component. However, the color has no special meaning, and it is possible to use any color component. However, each pixel corresponding to an object to be specified (bitmap object) will be referred to as "black" in this embodiment.

The print data creation unit 206 then performs the processing in step S509 to determine a bitmap region in the raster data format. That is, the print data creation unit 206 internally activates the raster data creation unit 203 of the OS 202 to rasterize created PDF data 2 and convert it into raster data 1. Note that it is necessary to transfer print setting information together with the input data in the PDF when the raster data creation unit 203 is to be operated. The print setting information to be transferred in this case is information including the same set values as those of the print setting information transferred to the print data creation unit 206 which are associated with at least pages. With this operation, raster data 1 obtained by the raster data creation unit 203 internally activated by the print data creation unit 206 becomes raster data to which the same page setting as that of the raster print data is applied. Consequently, the pixels of raster data 1 show one-to-once correspondence with those of the raster print data. Of raster data 1, a portion in which a rectangle is drawn, that is, a portion colored in black, represents a bitmap region contained in the raster print data. The print data creation unit 206 compares the raster print data with raster data 1 (object region data) which has been rasterized. If each pixel of raster data 1 is black, the print data creation unit 206 can determine that the corresponding region is a bitmap region. If each pixel of raster data 1 is not black, the print data creation unit 206 can determine a region other than a bitmap region. This makes it possible to specify an object to be specified on the raster print data in this manner. When, for example, the print data creation unit 206 rasterizes PDF data 2 in FIG. 6B described above with the setting "2 pages/sheet" by using the internally activated raster data creation unit 203, raster data 1 like that shown in FIG. 6C can be obtained. Rasterized object region data 606 in FIG. 6C is raster data having the same page arrangement as that of raster print data 607 in FIG. 6D.

In steps S510 and S511, the print data creation unit 206 processes raster data 1 for bitmap region determination and raster print data as general print data in accordance with region determination. In this case, if the processing to be performed in accordance with region determination is the processing of coating only a bitmap region with glossy ink as described above, the black pixels of raster data 1 for region determination represent a bitmap region, and the data can be used as region data to be directly coated with glossy ink. In this case, therefore, the apparatus performs only the processing of integrating raster data 1 into raster print data as component data for glossy ink. The glossy ink head of the printer A2 then prints an image corresponding to this component data for glossy ink. The general ink heads of C (cyan), M (magenta), Y (yellow), and K (black) print an image corresponding to the raster print data 607. In step S512, the print data creation unit 206 deletes PDF data 1 which has become unnecessary. Lastly, in step S513, the print data creation unit 206 converts the raster print data obtained by integrating the region data to be coated with glossy ink into print data. In step S514, the print data creation unit 206 outputs the data and terminates the processing. Finally, the print data created in this manner is sent to the printer via the back-end 207 to print an image. In this case, in step S513, if no component data for glossy ink is added, the print data creation unit 206 determines that an entire page is coated with glossy ink and prints the component data for glossy ink on the entire page.

In this manner, the printer driver creates PDF data 2 in which rectangles are drawn in bitmap regions in print data, and causes the raster data creation unit 203 of the OS 202 to convert PDF data 2 into raster data for region determination. The printer driver then refers to the raster data. With this operation, the printer driver can determine a bitmap region in print data independently of various settings associated with pages applied by the raster data creation unit 203. In addition, drawing a colored rectangle allows to accurately determine a region even if the background color of a bitmap object as a region determination target is the same as the color of the page. Furthermore, applying the present invention makes it possible to perform the processing of coloring the background of a bitmap region, error diffusion processing, and switching of different types of color processing as well as the processing of coating a bitmap region with special ink.

Second Embodiment

The second embodiment will be described next. In the following description, an illustration and description of drawings common to the first and second embodiments will be omitted, and only differences between them will be described.

In the first embodiment, the print data creation unit 206 of the printer driver 204 performs the processing of creating PDF data 2 for region determination in which rectangles are drawn in bitmap regions and the processing of converting PDF data 2 into raster data 1 for region determination. The second embodiment is a modification of the first embodiment. In the second embodiment, a data conversion unit 205 of a printer driver 204 performs these processes.

Figure 7:
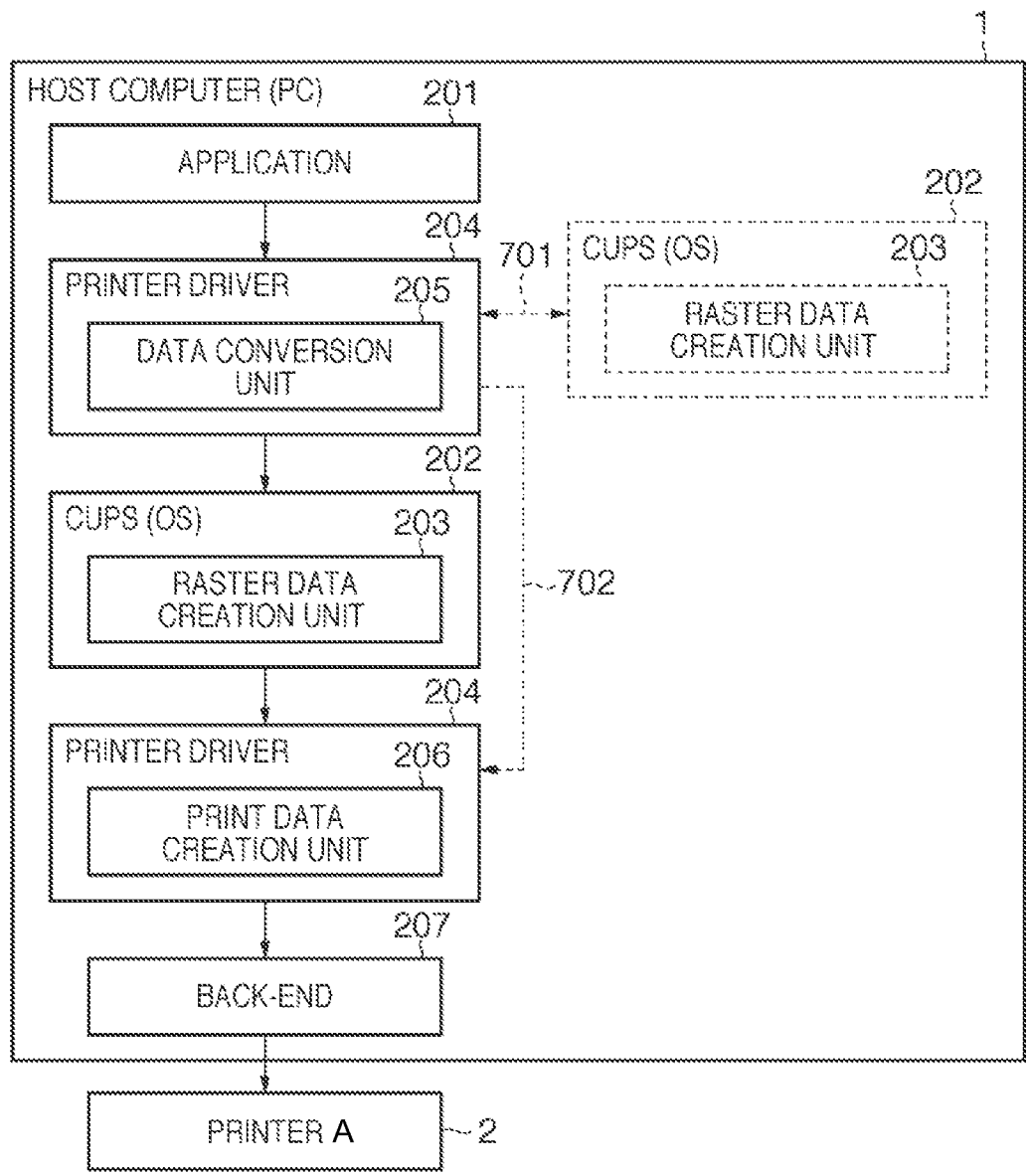
FIG. 7 is a block diagram showing the second embodiment of the present invention to explain a processing procedure for print data.

FIG. 7 is a block diagram for explaining a processing procedure for print data in the second embodiment. FIG. 7 includes a data flow 701 between the data conversion unit 205 and a raster data creation unit 203 and a data flow 702 from the data conversion unit 205 to a print data creation unit 206. The data conversion unit 205 performs the processing of analyzing the internal command of PDF print data and creating PDF data 2 (S508) and the processing of causing the raster data creation unit 203, which is internally activated, to convert PDF data 2 into raster data 1 (S509). These processes are the same as those performed by the print data creation unit 206 in the first embodiment. The data conversion unit 205 then stores created raster data 1 for region determination in an external storage device 104. Referring to the data shown in FIGS. 6A to 6D, in the first embodiment, PDF print data like that shown in FIG. 6A is stored in the external storage device 104. In contrast, in the second embodiment, raster data like that shown in FIG. 6C is stored in the external storage device 104. The print data creation unit 206 then acquires the raster data for region determination, which the data conversion unit 205 stores in the external storage device 104. The print data creation unit 206 can determine a bitmap region contained in the print data by referring to each pixel as in the first embodiment.

That is, in this embodiment, the data conversion unit 205 executes steps S508 and S509 in place of step S503 of steps S501 to S504 in FIG. 5A, and stores created raster data 1 (rasterized object region data) in the external storage device 104. The print data creation unit 206 then executes steps S505 to S514 in FIG. 5B except for steps S508 and S509. The data acquired in step S507 is not PDF data 1 but is stored raster data 1.

In this manner, it is possible to flexibly change the assignment of functions to the data conversion unit and the print data creation unit. This change will not change the effects of the first embodiment.

Third Embodiment

The third embodiment will be described next. In the following description, an illustration and description of drawings common to the above embodiments will be omitted, and only differences between them will be described.

The third embodiment is a modification of the first and second embodiments. In the third embodiment, a data conversion unit 205 creates PDF data 2 in which a rectangle is drawn in a bitmap region in bitmap region determination, and a print data creation unit 206 converts PDF data 2 into raster data 1 for region determination. In this case, a block diagram showing a processing procedure for print data is the same as that shown in FIG. 3 showing the first embodiment. This embodiment differs from the first embodiment in the data format of data transferred from the data conversion unit 205 to the print data creation unit 206 along a data flow 301.

The data conversion unit 205 analyzes the internal command of PDF print data, and creates PDF data 2 in which a rectangle pained out in color is drawn in a bitmap region. The data conversion unit 205 then stores PDF data 2 in the external storage device 104. Referring to the data shown in FIGS. 6A to 6D, in the first embodiment, PDF print data like that shown in FIG. 6A is stored in the external storage device 104. In contrast, in the third embodiment, PDF data 2 for region determination like that shown in FIG. 6B is stored in the external storage device 104. The print data creation unit 206 then acquires PDF data 2, which the data conversion unit 205 stores in the external storage device 104. The print data creation unit 206 causes the raster data creation unit 203, which is internally activated, to rasterize PDF data 2 into raster data 1. The print data creation unit 206 can determine a bitmap region contained in print data by referring to the colored pixels of created raster data 1 for region determination as in the first embodiment.

That is, in this embodiment, the data conversion unit 205 executes steps S507 and S508 in place of step S503 in FIG. 5A, and stores created PDF data 2 (object region data) in the external storage device 104. The print data creation unit 206 then executes steps S505 to S514 in FIG. 5B except for steps S507 and S508. PDF data 2 to be processed in step S509 is the data created by the data conversion unit 205 and stored.

In this manner, it is possible to flexibly change the assignment of functions to the data conversion unit and the print data creation unit. This change will not change the effects of the first embodiment.

Fourth Embodiment

The fourth embodiment will be described next. In the following description, an illustration and description of drawings common to the above embodiments will be omitted, and only differences between them will be described.

In the fourth embodiment, a printer driver 204 determines not only a bitmap region contained in print data but also other object regions such as a text region and graphic region. Note that a block diagram showing a processing procedure for print data has the same arrangement as that shown in FIG. 3. Assume that a print data creation unit 206 creates PDF data 2 in which an object is drawn in a region as a region determination target and converts created PDF data 2 into raster data 1 for region determination as in the first embodiment.

In the determination of regions other than a bitmap region, for example, a text region and a graphic region, it is possible to determine the region of a target object by drawing the object in PDF data 2 in advance at the same time when creating PDF data 2 for region determination. FIGS. 8A to 8D show an example of print data at this time. In this case, the apparatus simultaneously determines a text region in addition to bitmap regions. Note that FIGS. 8A to 8D correspond to FIGS. 6A to 6D for the determination of only bitmap regions.

Figure 8A:
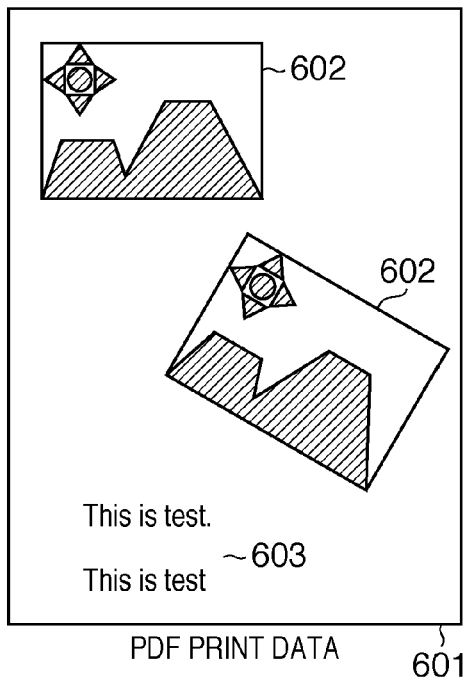
FIGS. 8A, 8B, 8C, and 8D are views each showing an example of actual print data and data created for bitmap region determination and text region determination.
Figure 8B:
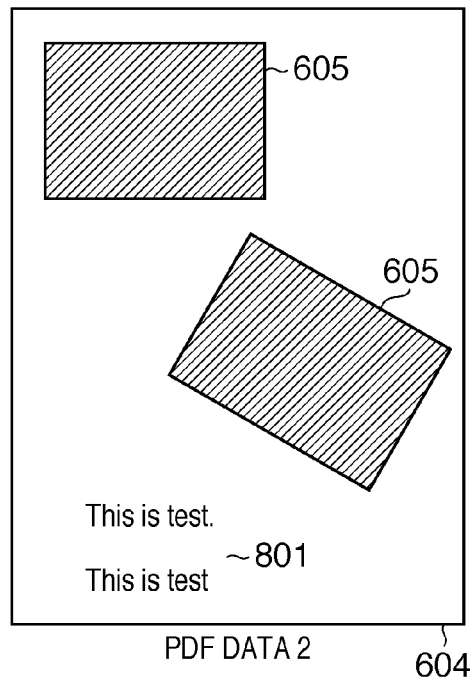
Figure 8C:
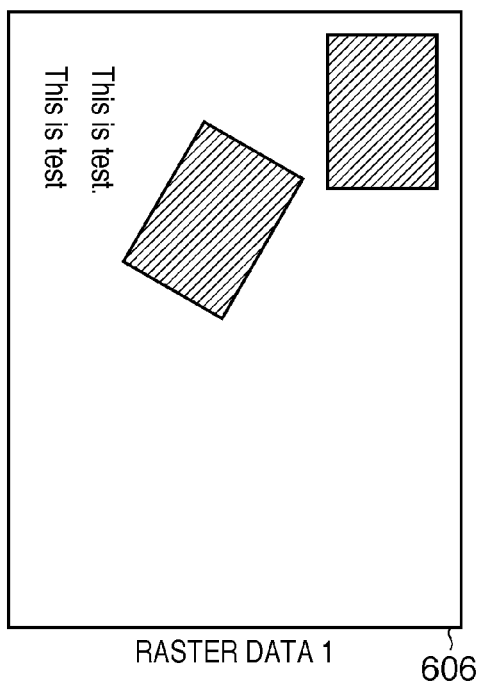
Figure 8D:
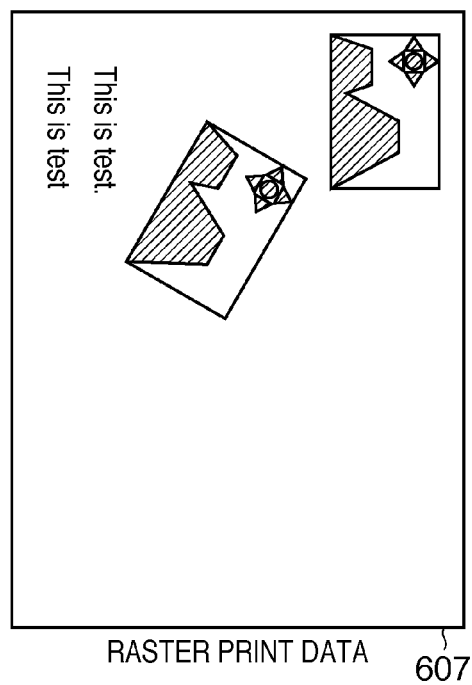

Like FIG. 6A, FIG. 8A shows print data in PDF. FIG. 8D shows print data in the raster data format which is created with the setting "2 pages/sheet". FIG. 8B shows PDF data 2 in which the bitmap regions and text region obtained by analyzing the PDF print data in FIG. 8A are colored. This data simultaneously draws a text region 801 as well as bitmap regions. FIG. 8C shows an example of raster data 1 for region determination, which is created by internally activating a raster data creation unit 203 using the print data creation unit 206 to rasterize PDF data 2 in FIG. 8B. The print data creation unit 206 can simultaneously determine a text region as well as bitmap regions by referring to colored pixels of created raster data 1. In the case shown in FIGS. 8A to 8D, for the sake of illustrative convenience, the bitmap regions and the text region are colored in the same black color. If, however, the bitmap regions and the text region are draw in different colors in advance, for example, the bitmap regions are drawn in black and the text region is drawn in red, at the time of the creation of PDF data 2 in FIG. 8B for region determination, it is possible to determine the respective regions by color.

The data conversion unit 205 then decides in step S502 from the print setting information whether to determine a bitmap region.

That is, according to this embodiment, the data conversion unit is configured to make a decision whether to determine "certain object regions" instead of a decision whether to determine "bitmap regions" in steps S502 and S506 in FIGS. 5A and 5B. In this case, "certain object" indicates an object as a determination target such as a bitmap, text, or line art. Such objects may be determined in advance or designated by the user for each operation.

In this embodiment, this makes it possible to accurately specify the regions of objects other than bitmaps, as the types of objects, from raster data.

In addition, it is possible to specify object regions not for each type of object but for each designated object. For this purpose, for example, the user is made to select a target object, in advance, from the data in the format (for example, PDF) input to the raster data creation unit. It is possible to specify the selected object from the raster data output from the raster data creation unit.

The first to fourth embodiments have exemplified the case in which the spool file is in PDF which is a standard format of the OS. However, the present invention is not limited to this. For example, the present invention can be effectively applied to a case in which the spool file format is PostScript from Adobe Systems. In this case, the data conversion unit 205 of the printer driver 204 may be designed to handle PostScript. The data conversion unit 205 inputs and outputs data in the PostScript format, and the raster data creation unit 203 of the OS 202 converts data in the PostScript format into raster data. It is therefore easy to apply the present invention to this case by replacing data in the PDF format processed by the data conversion unit 205 and print data creation unit 206 of the printer driver 204 with data in the PostScript format. In addition, even if a spool file is in the PostScript format, letting the data conversion unit 205 have a conversion function from Postscript to PDF makes it possible to convert the data format processed by the print data creation unit 206 for bitmap region determination into PDF. It is possible to specify object regions in the same manner as in the above embodiments. The same applies to a case in which a spool file is in PDF, and the data format processed by the print data creation unit 206 is desired to be the PostScript format.

In the first to fourth embodiments, the operating system to be used is Mac OS. However, if the raster data creation unit has a function of reflecting a change in the arrangement of objects in output data (for example, a rotating function, magnifying function, or layout function), the present invention can be applied to a case in which an OS other than Mac OS is used. The same applies to a case in which the raster data creation unit is an external function provided by another vendor instead of being provided by the operating system.

In the first to fourth embodiments, it is possible to perform processing other than that described in the above embodiments for an object specified in the raster data output from the raster data creation unit. If, for example, a specified object is a character and its region is smaller than a predetermined size, it is possible to replace it with another object (for example, a character string of X marks). When processing a specific object in the target raster data output from the raster data creation unit capable of changing the arrangement of objects in this manner, the present invention allows to easily specify the target object.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-028212, filed Feb. 10, 2010, which is hereby incorporated by reference herein in its entirety.

What is claimed is:

1. An information processing apparatus which includes a raster data creation unit configured to convert data in a format which is described by a page description language into raster data, the apparatus comprising:

a creation unit, configured to create object region data in the format based on processing target data, wherein the object region data includes an object for indicating a position of a region of a specific object contained in the processing target data, and wherein the object included in the object region data indicates the position in a page represented by the processing target data;

an obtaining unit configured to obtain first and second raster data, wherein the first raster data is created by converting the processing target data including the specific object by the raster data creation unit according to a print setting regarding a region where the specific object is rasterized, and the second raster data is created by converting the object region data including the object by the raster data creation unit according to the same print setting as the print setting used for converting regarding the layout of the region where the specific object is rasterized; and a specifying unit, configured to specify a position of the region where the object included in the object region data is rasterized by the raster data creation unit in a page represented by the obtained second raster data, to specify a position of a region where the specific object is rasterized in a page represented by the obtained first raster data, wherein a processing that uses the position of the region where the specific object is rasterized is applied to the first raster data, the position having been specified by the specifying unit.

2. The apparatus according to claim 1, wherein the specific object comprises a specific type of object.

3. The apparatus according to claim 2, wherein the specific type of object comprises a bitmap object.

4. The apparatus according to claim 1, further comprising:
an interface unit, configured to connect to a raster printer including a function of forming an image with glossy ink in addition to a function of forming an image with color ink; and
a processing unit, configured to add the specific object of which the position of the region is specified by the specifying unit and converted into raster data, as a component corresponding to the glossy ink, to the processing target data converted into raster data.

5. The apparatus according to claim 1, further comprising a unit, configured to replace the specific object, which is contained in the processing target data converted into raster data and of which the position of the region is specified by the specifying unit, with another object.

6. The apparatus according to claim 1, wherein the format is one of a PDF (Portable Document Format) format and a PostScript format.

7. An information processing method executed by an information processing apparatus which includes a raster data creation unit configured to convert data in a format which is described by a page description language into raster data, the method comprising:
a creation step of creating object region data in the format based on processing target data, wherein the object region data includes an object for indicating a position of a region of a specific object contained in the processing target data, and wherein the object included in the object region data indicates the position in a page represented by the processing target data;
an obtaining step of obtaining first and second raster data, wherein the first raster data is created by converting the processing target data including the specific object by the raster data creation unit according to a print setting regarding a layout of a region where the specific object is rasterized, and the second raster data is created by converting the object region data including the object by the raster data creation unit according to the same print setting as the print setting used for converting regarding the layout of the region where the specific object is rasterized; and
a specifying step of specifying a position of the region where the object included in the object region data is rasterized by the raster data creation unit in a page represented by the obtained second raster data, to specify a position of a region where the specific object is rasterized in a page represented by the obtained first raster data, wherein a processing that uses the position of the region where the specific object is rasterized is applied to the first raster data, the position having been specified by the specifying unit.

8. A non-transitory computer-readable storage medium storing a program for causing a computer which provides, as part of an operating system, a raster data creation unit configured to convert data in a format which is described by a page description language into raster data, the program comprising:
code for creating object region data in the format based on processing target data, wherein the object region data includes an object for indicating a position of a region of a specific object contained in the processing target data, and wherein the object included in the object region data indicates the position in a page represented by the processing target data;
code for obtaining first and second raster data, wherein the first raster data is created by converting the processing target data including the specific object by the raster data creation unit according to a print setting regarding a layout of a region where the specific object is rasterized, and the second raster data is created by converting the object region data including the object by the raster data creation unit according to the same print setting as the print setting used for converting regarding the layout of the region where the specific object is rasterized; and
code for specifying a position of the region where the object included in the object region data is rasterized by the raster data creation unit in a page represented by the obtained second raster data, to specify a position of a region where the specific object is rasterized in a page represented by the obtained first raster data, wherein a processing that uses the position of the region where the specific object is rasterized is applied to the first raster data, the position having been specified by the specifying code.

* * * * *